(12) United States Patent
Williams et al.

(10) Patent No.: US 11,865,387 B2
(45) Date of Patent: Jan. 9, 2024

(54) FLUID CONTROL ASSEMBLIES FOR SPRINKLER SYSTEMS

(71) Applicant: Tyco Fire Products LP, Lansdale, PA (US)

(72) Inventors: James O. Williams, Marlborough, MA (US); Roger S. Wilkins, Warwick, RI (US)

(73) Assignee: Tyco Fire Products LP, Cranston, RI (US)

( * ) Notice: Subject to any disclaimer, the term of this patent is extended or adjusted under 35 U.S.C. 154(b) by 25 days.

(21) Appl. No.: 17/474,641

(22) Filed: Sep. 14, 2021

(65) Prior Publication Data

US 2021/0402237 A1    Dec. 30, 2021

Related U.S. Application Data

(63) Continuation of application No. 16/743,688, filed on Jan. 15, 2020, now Pat. No. 11,123,588, which is a
(Continued)

(51) Int. Cl.
*F16K 31/42* (2006.01)
*A62C 35/68* (2006.01)
(Continued)

(52) U.S. Cl.
CPC .............. *A62C 35/68* (2013.01); *F16K 7/126* (2013.01); *F16K 15/033* (2013.01); *F16K 31/02* (2013.01); *F16K 37/0041* (2013.01)

(58) Field of Classification Search
CPC ................................. F16K 31/42; A62C 35/68
(Continued)

(56) References Cited

U.S. PATENT DOCUMENTS

| 3,957,244 A | 5/1976 | Chauvigne |
| 5,632,465 A | 5/1997 | Cordua |

(Continued)

FOREIGN PATENT DOCUMENTS

| CN | 1470787 A | 1/2004 |
| CN | 101548122 A | 9/2009 |

(Continued)

OTHER PUBLICATIONS

English Translation of Office Action Received for CN Application No. 201580052977.0, dated Mar. 7, 2019, 7 pages.
(Continued)

*Primary Examiner* — Paul J Gray
(74) *Attorney, Agent, or Firm* — Foley & Lardner LLP

(57) ABSTRACT

Automatic fluid control assemblies and methods for fire protection include an arrangement of electrically operated control points, a valve body and a controller to operate the fluid control assembly. The automatic fluid control assembly has an inlet, an outlet and a valve body to control flow between the inlet and the outlet. An electric latch includes a first electrically operated control point and a second electrically operated control point in fluid communication with a control line to control the flow of fluid from the inlet to the valve body and outlet. The methods of fluid control include controlling a plurality of electrically operated control points to perform any one of: a leak test, a trip test, a flow test, a water delivery test, and a validation test of a non-trip condition and a trip condition.

16 Claims, 5 Drawing Sheets

Related U.S. Application Data continuation of application No. 16/185,297, filed on Nov. 9, 2018, now Pat. No. 10,561,874, which is a continuation of application No. 15/501,378, filed as application No. PCT/US2015/043488 on Aug. 3, 2015, now abandoned.

(60) Provisional application No. 62/032,896, filed on Aug. 4, 2014.

(51) Int. Cl.
  *F16K 7/12* (2006.01)
  *F16K 15/03* (2006.01)
  *F16K 31/02* (2006.01)
  *F16K 37/00* (2006.01)

(58) Field of Classification Search
  USPC .................................. 137/79, 554; 251/30.02
  See application file for complete search history.

(56) References Cited

U.S. PATENT DOCUMENTS

| | | | |
|---|---|---|---|
| 5,655,561 A * | 8/1997 | Wendel | G01F 23/243 137/59 |
| 5,887,847 A | 3/1999 | Holborow | |
| 6,328,275 B1 | 12/2001 | Yang et al. | |
| 6,779,541 B2 | 8/2004 | Inayama et al. | |
| 8,490,646 B2 * | 7/2013 | Bush | F16K 31/1264 251/30.02 |
| 8,616,234 B2 | 12/2013 | Ringer et al. | |
| 2003/0234051 A1 | 12/2003 | Toivonen et al. | |
| 2004/0011537 A1 | 1/2004 | Jackson et al. | |
| 2010/0071776 A1 | 3/2010 | Ringer et al. | |
| 2010/0193202 A1 * | 8/2010 | Reilly | A62C 35/68 169/46 |
| 2012/0042721 A1 * | 2/2012 | Al-Buaijan | F16K 37/0075 73/168 |
| 2012/0204974 A1 | 8/2012 | Sakasegawa et al. | |
| 2012/0325502 A1 * | 12/2012 | Hennegan | A62C 35/62 169/37 |

FOREIGN PATENT DOCUMENTS

| | | |
|---|---|---|
| EP | 1 375 990 A1 | 1/2004 |
| WO | WO-2015/181709 A1 | 12/2015 |

OTHER PUBLICATIONS

IFW, U.S. Appl. No. 62/032,896, filed Aug. 4, 2014, 142 pages.
International Search Report and Written Opinion for International Application No. PCT/US2015/043488, dated Jan. 12, 2016, 14 pages.
International Search Report and written Opinion on PCT/US2015/043488, dated Jan. 12, 2016, 13 pages.
Office Action and English Translation Received for Russian Application No. 2017106964, dated Aug. 14, 2019,.
Office Action on CN 201580052977.0, dated Jun. 27, 2018, 8 pages with translation.

* cited by examiner

FLUID CONTROL ASSEMBLIES FOR SPRINKLER SYSTEMS

PRIORITY CLAIM

This application is a continuation of U.S. patent application Ser. No. 16/743,688, filed Jan. 15, 2020, which is a continuation of U.S. patent application Ser. No. 16/185,297, filed Nov. 9, 2018, which is a continuation of U.S. patent application Ser. No. 15/501,378, filed Feb. 2, 2017, which is a National Stage Application of International Patent Application No. PCT/US2015/043488, filed Aug. 3, 2015, which claims the benefit of priority to U.S. Provisional Application No. 62/032,896, filed on Aug. 4, 2014, each of which is incorporated herein by reference in its entirety.

TECHNICAL FIELD

The present invention relates generally to fire protection systems and more specifically to fluid control risers or assemblies for fire protection systems.

BACKGROUND ART

Water based fire protection systems are largely mechanical devices that may have some electronic switches for control. For example, TYCO FIRE PROTECTION PRODUCTS Technical Data Sheet, "TFP1465: Preaction System with Model DV-5 Deluge Valve Double Interlock—Electric/Electric Actuation 1½ thru 8 Inch (DN40 thru DN200)" (May 2009) shows a double interlock preaction fire protection system with a valve and check valve riser assembly that includes a releasing trim that uses a solenoid valve that is operated by energizing the releasing circuit of a releasing panel.

Despite the use of some electrical switches, the large mechanical devices of the valve trim can occupy a large amount of space for the system installation. Accordingly, it would be desirable to use electrical components and control to reduce the installation space requirements. The use of mechanical components in the valve trim for the operation and control can also place limits on personnel to maintain and troubleshoot the system. In particular, personnel are required to observe and operate the mechanical devices at the site of the installation in order to maintain, diagnose problems and troubleshoot the system.

DISCLOSURE OF INVENTION

Preferred embodiments of an automatic fluid control assembly are provided for use in fire protection systems and methods. The preferred fluid control assemblies include an arrangement of electrically operated control points and fluid detectors coupled to a valve body and in communication with a controller to detect and control the flow of fluid through the chambers and ports of the valve body to preferably remotely operate, monitor, maintain, and troubleshoot the fluid control assembly and fire protection systems in which the assembly is installed. Moreover, by electrically coupling the automatic fluid control assemblies with a controller capable of remote communication, system anomalies and operating parameters can be reported remotely to notify concerned parties and personnel. Accordingly, the preferred embodiments can eliminate or significantly reduce the need for visual confirmation or observation at the site of the system to maintain the assembly and fire protection system. Particular embodiments of the fluid control assembly include a preferred arrangement of two electrically operated control points that control the pressure within a fluid chamber of a fluid controlled valve in order to operate the valve and provide a preferred electric latch that maintains the valve open in the event of a power loss.

A preferred automatic fluid control assembly has an inlet and an outlet, which define an unactuated state of the assembly in which the inlet is sealed from the outlet and an actuated state of the assembly in which the inlet is in fluid communication with the outlet. The assembly further preferably includes a fluid pressure biased diaphragm valve body that has an internal seat and an internal diaphragm member for engaging the seat to control flow between the inlet and the outlet. The diaphragm member defines a fluid chamber to control the engagement between the diaphragm member and the seat. The assembly further preferably includes a fluid control line having one end in fluid communication with the inlet and another end in communication with the diaphragm chamber. A preferred electric latch includes a first electrically operated control point and a second electrically operated control point in fluid communication with the control line to control the flow of fluid from the inlet to the diaphragm chamber. The first control point in the unactuated state of the automatic fluid control assembly preferably defines a normally energized open configuration to place the inlet in fluid communication with the fluid chamber for pressurizing the fluid chamber to provide a sealed engagement between the diaphragm member and the internal seat. In the actuated state of the automatic valve, the first control point defines a de-energized closed configuration to prevent pressurization of the diaphragm chamber. The second electrically operated control point in the unactuated state of the automatic valve defines a preferably normally dc-energized closed configuration to prevent the release of pressure from the diaphragm chamber to maintain the sealed engagement between the diaphragm member and the internal seat. In the actuated state of the automatic assembly, the second control point preferably defines an energized open configuration to release pressure from the diaphragm chamber such that the diaphragm member disengages the internal seat to permit fluid flow from the inlet to the outlet. In the preferred embodiment, the first and second electrically operated control points are electrically operated solenoid valves.

In preferred embodiments of the fluid control assembly, a fluid detector monitors fluid flow downstream of the internal seat. The fluid detector is coupled to the first electrically operated control point to de-energize the first electrically operated control point upon detecting a fluid flow. Alternatively, the first and/or the second electrically operated control point change configuration in response to a fire detector such that the first control point dc-energizes closed and the second control point energizes open. In one preferred aspect, the first and second electrically operated control points change configurations substantially simultaneously.

In preferred embodiments, the automatic fluid control assembly defines an intermediate chamber between the inlet and the outlet. In one particular embodiment, a check valve is coupled to the diaphragm valve body. In the particular embodiment, the check valve defines the outlet, the diaphragm valve body defines the inlet, the check valve and the diaphragm valve body defines an intermediate chamber between the check valve and the diaphragm valve body. In an alternate embodiment of the assembly, the internal seat of the diaphragm valve body defines an outlet seat and an inlet seat with an intermediate chamber between the inlet and outlet seat. In preferred embodiments, the assemblies further preferably include an inlet port proximate the inlet and a first fluid detector coupled to the inlet port, an outlet port is proximate the outlet and a second fluid detector is coupled to the outlet port. An intermediate port is proximate the intermediate chamber and a third fluid detector is preferably coupled to the intermediate port. For the preferred embodiments of the automatic fluid control assembly, a controller can be coupled to each of the first, second and third fluid detectors. The controller preferably configures each of the first, second and third fluid detectors for periodic monitoring to determine at least one of an operation or defect in the fluid control assembly.

The preferred embodiments of the automatic fluid control assemblies can provide for any one of a wet, a deluge, a dry pipe or preaction fire protection system. The preferred system include a fluid supply, a plurality of fire protection sprinklers interconnected by a network of pipes, a plurality of fire and fluid detectors and a controller coupled to the plurality of detectors and control points of the assembly. In a preferred embodiment, the plurality of detectors include resetting detectors that detect when heat from a fire has substantially diminished with the controller coupled to the resetting detectors and the plurality of electrically controlled points to control operation of the plurality of electrically controlled points based upon monitored data from the reset detectors to automatically reset the fluid control assembly when the heat from a fire is substantially diminished.

Preferred methods of automatic fluid control of a fire protection system are provided. A preferred method includes using an electrically powered fluid control assembly defining an inlet and an outlet with a valve body having a fluid chamber for controlling the fluid communication between the inlet and the outlet. A first electrically operated control point is in fluid communication with the fluid chamber and a second electrically operated control point is in fluid communication with the fluid chamber. The preferred methods include automatically energizing the first control point in a normally open configuration with the second control point in the normally de-energized closed configuration to pressurize the fluid chamber such that the inlet is sealed from the outlet in an unactuated state of the fire protection system; and automatically energizing the second control point to an open configuration and de-energizing the first control point to a closed configuration to reduce the pressure in the fluid chamber to trip the fluid control assembly and electrically latch the inlet into fluid communication with the outlet in an actuated state of the fire protection system. The preferred methods further include monitoring fluid conditions at any one of the inlet, outlet and fluid chamber and remotely controlling a plurality of electrically operated control points in response to the monitored fluid condition. Each control point is in fluid communication with any one of the inlet, outlet and fluid chamber to remotely perform any one of: a leak test, a trip test, a flow test, a water delivery test, performance validation test including any one of validation of a non-trip condition and a trip condition. Where the fluid control assembly defines an intermediate chamber in between the inlet and the outlet, the monitoring preferably includes monitoring the fluid conditions of the intermediate chamber and the remote controlling includes remotely controlling a control point in fluid communication with the intermediate chamber in response to the monitored fluid conditions of the intermediate chamber so as to provide an automatic drain.

A preferred embodiment of the method includes performing a remote trip test including: simulating a fire condition and an air loss condition at a controller coupled to each of the first and second control points; detecting fluid flow to an intermediate chamber of the fluid control assembly between the inlet and the outlet; and energizing a third control point in fluid communication with the outlet to an open configuration so as not to flood piping of the fire protection system. The trip test can be recorded by the system controller. Another preferred aspect of the method includes automatically resetting the fluid control assembly, which includes detecting a resetting condition; de-energizing the second control point to the closed configuration in response to the resetting condition; and energizing the first control point to the open configuration in response to the resetting condition to seal the inlet from the outlet. In one preferred aspect of automatically resetting, the method includes energizing a third control point in fluid communication with the outlet to an open configuration in response to the inlet being sealed from the outlet to drain system piping; monitoring the outlet for atmospheric pressure; and de-energizing the third control to a closed configuration. Alternatively, the method of resetting includes monitoring the outlet pressure for system gas pressure in the unactuated state of the fire protection system.

Although the Disclosure of the Invention and the preferred systems and methods can provide for electrically operated components and control of a releasing trim using a deluge valve like the Model DV-5 Deluge Valve, it is to be understood that the preferred systems and method can provide for fluid control assemblies and methods using other valve bodies or to control the flow between other fluid control components. The Disclosure of the Invention is provided as a general introduction to some embodiments of the invention, and is not intended to be limiting to any particular configuration or system. It is to be understood that various features and configurations of features described in the Disclosure of the Invention can be combined in any suitable way to form any number of embodiments of the invention. Some additional preferred embodiments including variations and alternative configurations are provided herein.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention, it should be understood that the preferred embodiments are some examples of the invention as provided by the appended claims.

MODE(S) FOR CARRYING OUT THE INVENTION

Figure 1:
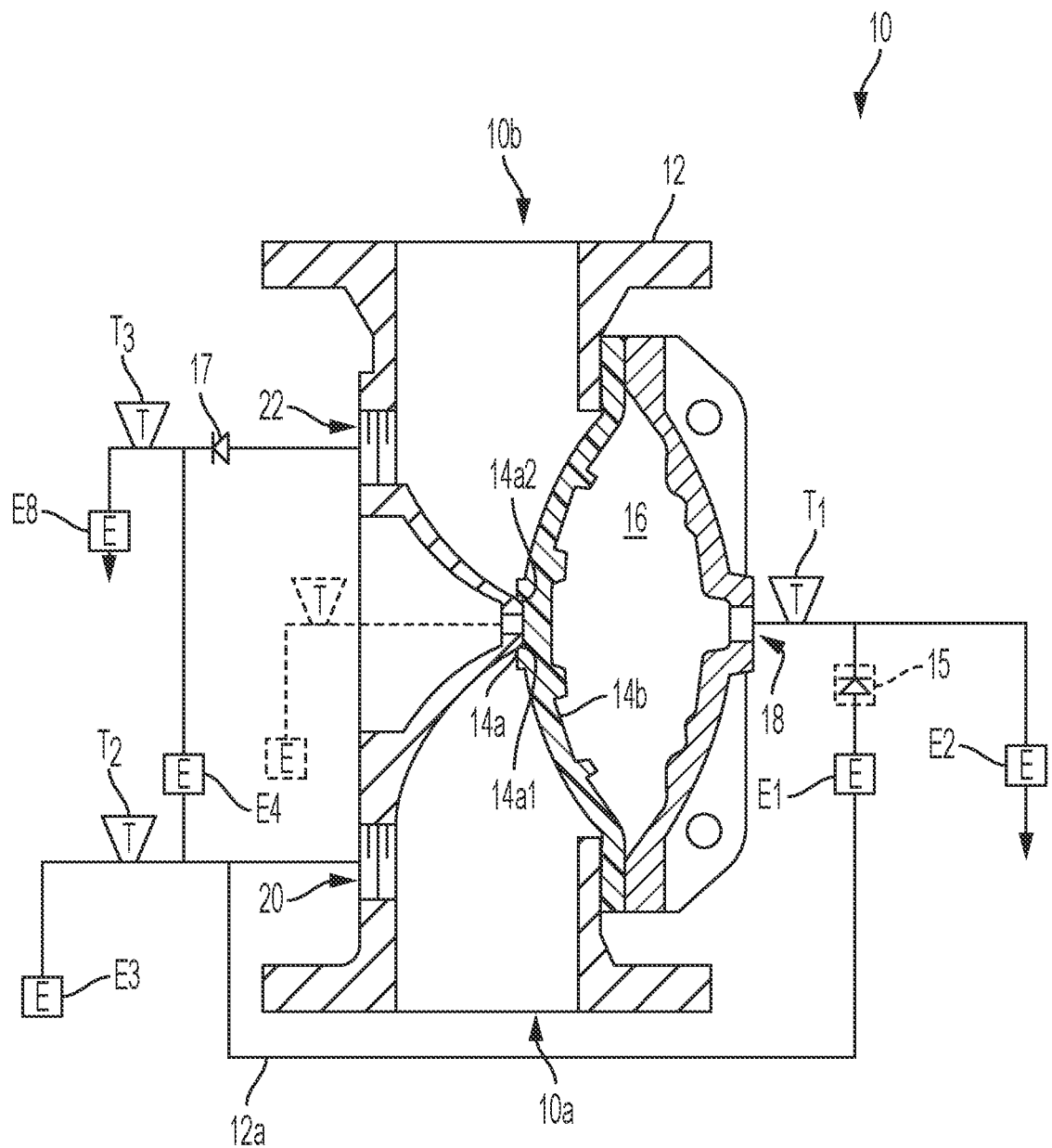
FIG. 1 is a schematic view of preferred embodiments of a fluid control assembly.

Shown in FIG. 1 is a preferred embodiment of an automatic fluid control assembly 10 for use in a fire protection system in order to control the flow of a firefighting fluid from a source to a piping network of interconnected of fire protection sprinklers. The preferred control assembly 10 includes an inlet 10a to which the fluid can be supplied, an outlet 10b from which the fluid is discharged and a valve body 12 for controlling flow between the inlet 10a and the outlet 10b. The assembly 10 defines an unactuated state in which the inlet is sealed from the outlet and an actuated state in which the inlet is in fluid communication with the inlet. One preferred embodiment of the valve body 12 includes an internal seat 14a, a seat-engagement member 14b for a preferred fluid-tight sealed engagement with the seat 14a in the unactuated state of the assembly 10. A preferred controlled engagement and disengagement between the member 14b and the seat 14a controls the flow between the inlet 10a and the outlet 10b in the actuated state of the assembly. The preferred valve body 12 defines chambers and ports in communication with one another through which fluid flows to move the internal components of the valve body 12. Accordingly, the valve body 12 further preferably defines an internal fluid chamber 16 to control the engagement between the member 14b and the seat 14a.

The preferred assembly 10 includes one and more preferably includes more than one electrically controlled or operated control points E in fluid communication with the chambers or ports of the valve body 12. The control points E open or close to control the flow of one or more fluids, including a firefighting fluid, through the valve body 12 to control operation of the assembly 10 and the flow of the firefighting fluid from the inlet 10a to the outlet 10b. The electrically controlled points E are preferably embodied as electrically operated valves which are opened, closed or throttled open or closed by an appropriately configured control signal. More preferably, the electrically controlled points E are embodied as electrically operated solenoid valves which are opened or controlled by an appropriately configured energizing or de-energizing signal. The controlled points E can be alternatively embodied in an arrangement of electro-mechanical components provided the arrangement can be opened and closed to control the flow therethrough in response to an appropriate control signal.

The preferred control assembly 10 includes a first electrically controlled point E1 and a second electrically controlled point E2 to control the flow of fluid in and out of the fluid chamber 16. In operation, the first control point E1 is preferably normally configured to be energized opened for filling and pressurizing the fluid chamber 16 with fluid such that the member 14b engages the seat 14a. In operation, the second control point E2 is preferably normally configured closed and de-energized to prevent the flow of fluid out of the fluid chamber 16 such that the member 14b is maintained in a sealed engagement. A change in the normal state of each of the first and second control points E1, E2, provides for a net flow through the fluid chamber 16 that reduces the fluid pressure in the chamber 16 so that the member 14b disengages the seat 14a thereby permitting flow from the inlet 10a to the outlet 10b. In preferred embodiments described in greater detailed herein, the first and second control points can also provide for an electric latch to maintain the valve open in the event of a loss of power.

The control points E can be electrically controlled or operated in response to an appropriate signal delivered automatically or manually from a control signaling device such as for example, a controller, microprocessor, relay, detector or sensor. The opening and closing of the control points E are preferably controlled at least in part by one or more, environmental sensors or detectors, fluid sensors or detectors T, positional sensors P or remote controllers disposed about or coupled to the valve assembly 10 which are coupled directly or indirectly to the valve body 12 or the control points E. The fluid sensors or detectors T can detect the presence or change of fluid by any one of measuring pressure, fluid flow, a combination thereof and/or the time-rate of change thereof at any fluid port, inlet or outlet of the valve body 12 or along any piping coupled to the valve body 12. Accordingly, the sensors or detectors can include transducers, switches or other types of devices provided they can measure a fluid parameter and generate an appropriate signal for operation of the preferred assemblies and systems described herein. The positional sensors P can measure the position of a control point between its open and closed position. Based upon the monitored parameters, the control points E can be manually or automatically electrically operated to control the flow of fluid from the inlet 10a to the outlet 10b of the valve assembly 10. Accordingly, the preferred assembly 10 communicates with a controller to electrically couple the control points E and the detectors or sensors T, P. The control points B and the detectors or sensors T, P can be wired or mechanically coupled to the controller. Alternatively, the control points, detectors and sensor can be wirelessly coupled to the controller for the controlled communication described herein.

Moreover, the periodic monitoring of detected parameters including flow, pressure, position and/or temperature of the valve assembly 10, the fire protection and occupancy in which the assembly 10 is installed can be used to maintain the assembly 10 including periodically performing diagnostic performance testing, automatically notifying maintenance personnel or operators, periodically documenting current and past states of the assembly 10 for troubleshooting, automatically taking corrective action, periodically validating proper operation of the assembly 10 and/or performing test inspections at desired frequencies. The preferred automatic operation and maintenance of the assembly 10 can include remote programming of the controller, remote notifications, remote testing and remote setting of the valve assembly 10. Accordingly, the preferred automatic operation and maintenance of the assembly 10 can be conducted over two-way wired or wireless communication networks, including over telephone lines, the Internet, local networks, or other telecommunication means using telephones, mobile device, laptops, computer or other computing devices.

The valve body can be preferably embodied as a diaphragm valve 12 having an internal valve seat 14a, an internal diaphragm member 14b to provide the engagement member 14a and define the internal fluid chamber or diaphragm chamber 16. An exemplary diaphragm valve is shown in TYCO FIRE PROTECTION PRODUCTS Technical Data Sheet, "TFP1305: Model DV-5 Deluge Valve, Diaphragm Style, 1½ thru 8 Inch (DN40 thru DN200), 250, psi (17.2 bar) Vertical or Horizontal Installation (March 2006). Alternatively, other types of valves can be used provided they include a fluid control chamber for use in the assemblies described herein. More specifically, the preferred diaphragm valve 12 is fluid controlled or operated in which fluid pressure in the diaphragm chamber 16 controls or biases the valve toward a sealed engagement between the diaphragm member 14b and the valve seat 14a. The assembly 10 preferably includes a fluid control line 12a for controlling the fluid pressure in the diaphragm chamber 16. The control line 12a preferably includes one end in fluid communication with the inlet 10a and an opposite end in fluid communication with diaphragm chamber 16. The preferred first and second electrically operated solenoid valves E1, E2 are preferably in fluid communication with the control line 12a and coupled to the diaphragm valve 12 at a diaphragm chamber port 18 so as to control the flow of fluid in and out of the diaphragm chamber 16.

The diaphragm valve 12 preferably includes an inlet port 20 proximate to and in fluid communication with the inlet 10a. In a preferred arrangement, the first electrically controlled solenoid valve E1 controls the fluid communication between the inlet port 20 to the diaphragm chamber 16. More specifically, the first solenoid valve E1 operates to control fluid delivered to the inlet 10a and redirected to the diaphragm chamber via the inlet port 20. Moreover, the first solenoid valve E1 operates to control the flow rate of fluid into the diaphragm chamber 16 to a desired rate. Alternatively or in addition to, the flow rate and direction of flow can be maintained in one direction from the solenoid valve E1 to the diaphragm chamber 16 and at the desired rate by a check valve 15 or other flow restriction disposed between the solenoid valve E1 and the diaphragm chamber 16. Thus, fluid backflow is prevented back through the first solenoid valve E1. The second electrically operated solenoid valve E2 operates to control and maintain or relieve fluid pressure in the diaphragm chamber 16. The states of the controlled points E1, E2 can be electrically controlled in response to an appropriate control signal. For example, in a fire protection system such as for example, the deluge-type system shown in FIG. 3, the control points E1, E2 can be operated in response to a fire detection signal or other signal. The control points further preferably provide an electric latch that keeps the assembly open even in the event of power failure or loss to the system. Accordingly, the preferred electric latch provides, in the event of a primary and secondary power loss, that the diaphragm chamber 16 does not re-pressurize and close the diaphragm valve 12 during a fire event. In the event of a power loss, the electric latch maintains the fluid control assembly 10 in the open position preferably until such time as the assembly is manually reset.

Further preferably coupled to the inlet port 20 are one or more electrically controlled points E3, E4 to drain or convey fluid from the inlet port 20. Each of the controlled points E3, E4 can be embodied as an electrically operated solenoid valve that is preferably normally closed and de-energized. Upon receipt of an appropriate control signal, the solenoid valves E3, E4 can be energized open to release fluid from the inlet port 20. For example, solenoid valve E3 can be opened to release fluid to an external drain or atmosphere and E4 can be opened to flow fluid to a water flow alarm. The valve body 12 also preferably includes an outlet port 22 proximate to and in fluid communication with the outlet 10b and to which another control point E5 can be coupled. The fifth control point E5 can be embodied as an electronically operated solenoid valve that is normally closed and de-energized. Upon receipt of an appropriate control signal, the solenoid valve E5 can be energized open to release fluid from the outlet port 22. For example solenoid valve E5 can be signaled opened to release fluid to an external drain or atmosphere. Accordingly, depending upon the system installation of the fluid control assembly 10, the outlet port solenoid valve E5 can provide an electric automatic drain valve.

Each of the control points E can be operated, locally or remotely, automatically or manually from a preferably centralized appropriately configured controller. Alternatively or additionally, the states of the controlled points E are preferably altered or operated based upon monitored parameters of one or more fluid detectors T disposed about the assembly 10. Accordingly, each of the sensors or detectors T, P can be configured with the controller for automatic, periodic or continuous monitoring or for discrete on-demand sampling. For example, preferably coupled to the diaphragm chamber port 18 is a fluid detector T1 for preferably continuously or periodically monitoring fluid conditions in the diaphragm chamber 16. Fluid detectors T2, T3 can be respectively coupled to each of the inlet and outlet ports 20, 22 to preferably continuously or periodically monitor fluid conditions at the corresponding inlet 10a and/or outlet 10b for set-up, maintenance or testing of the assembly 10. For example, one solenoid valve E4 can be coupled between the inlet port 20 and the fluid detector T3 at the outlet port 22. If the solenoid valve E4 is controlled or operated open so that fluid flows from the inlet port 20 toward the solenoid valve E5, the fluid flow or pressure can be detected by the fluid detector T3 for signaling the controller of fluid flow. To prevent the flow of fluid into the outlet 10b, the assembly preferably include a check-valve 17 installed between the fluid detector T3 and the outlet port 22.

The diaphragm valve 12 can include a single seat 14a against which the diaphragm member 14b engages to form a fluid tight seal. Alternatively, the diaphragm valve 12 can define multiple valve seats 14a1, 14a2 for engagement with the diaphragm member 14b to define one or more chambers therebetween. For example, the valve body can define a first inlet valve seat 14a1 for engagement with a corresponding inlet portion of the diaphragm member 14b. A second valve seat 14a2, spaced from the first seat 14a1, can be provided for engagement with a corresponding outlet portion of the diaphragm member. An exemplary diaphragm valve is shown and described in U.S. Pat. No. 8,616,234. Shown in phantom is an optional intermediate chamber formed between the inlet and outlet seats 14a1, 14a2. A detector T and control point E can be can be coupled to an intermediate port 24 in fluid communication with the intermediate chamber to monitor the intermediate chamber and provide for controlled drainage of the intermediate chamber between the inlet and outlet seats 14a1, 14a2.

Figure 2:
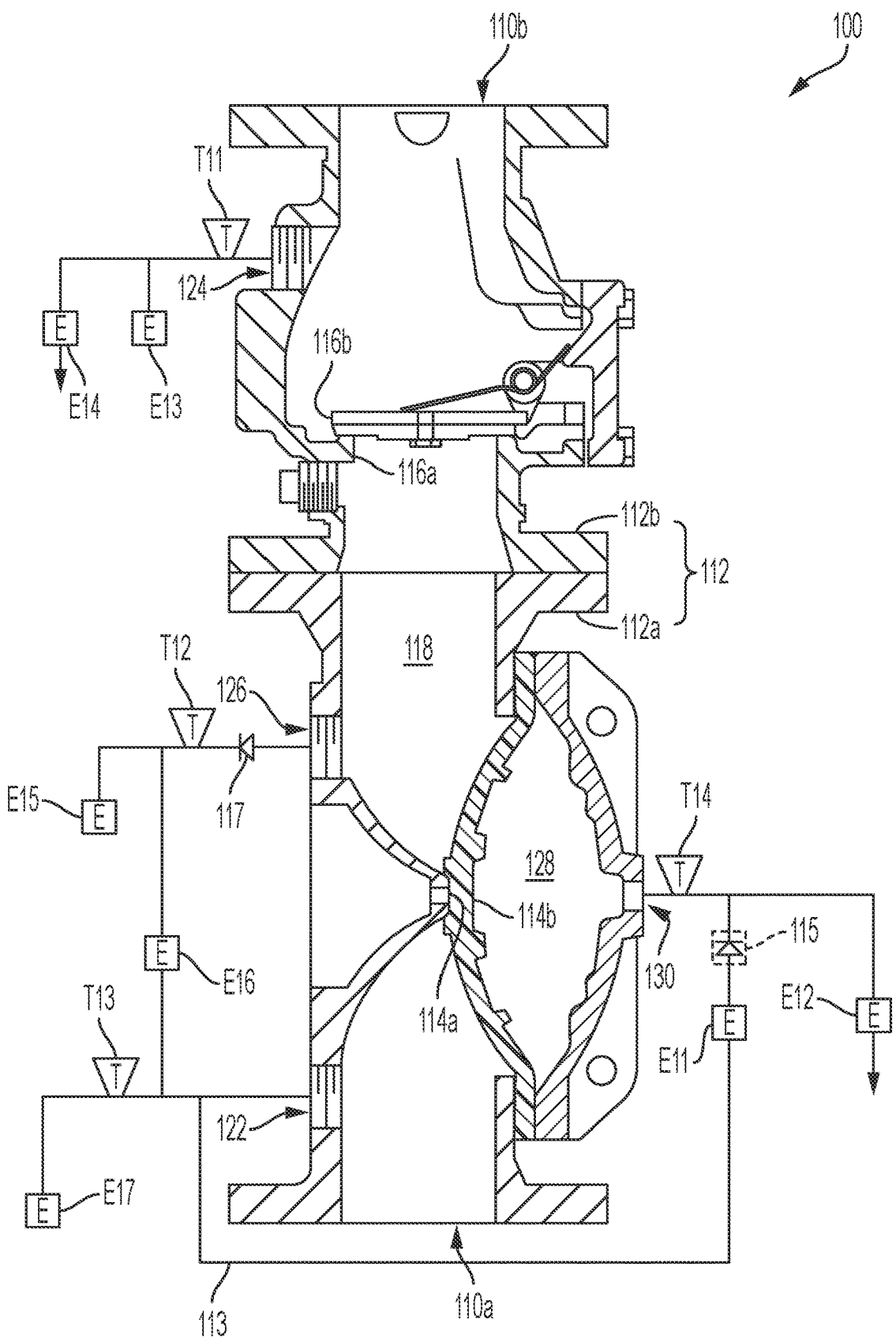
FIG. 2 is a schematic view of another preferred embodiment of a fluid control assembly.

An alternate embodiment of the automatic fluid control assembly 100 is shown in FIG. 2. The valve body 112 preferably includes an inlet seat 114a proximate the inlet 110a and an inlet member 114b for preferably controlled engagement with the inlet seat 114a. The valve body 112 further includes an outlet seat 116a proximate the outlet 110b and an outlet member 116b for engagement with the outlet seat 116a. The valve body 112 preferably defines an intermediate chamber 118 between the inlet and outlet seats 114a, 116a upon the inlet member 114b engaging the inlet seat 114a and the outlet member 116b engaging the outlet seat 116a. The preferred valve body 112 defines an inlet port 122 proximate the inlet 110a and more preferably located between the inlet 110a and the inlet seat 114a. The preferred valve body 112 also defines an outlet port 124 proximate the outlet 110b and more preferably located between the outlet 110b and the outlet seat 116a. The valve body 112 further preferably includes an intermediate port 126 in communication with the preferred intermediate chamber 118. A preferred embodiment of the valve body 112 includes a fluid chamber 128 with a fluid chamber port 130 proximate to the inlet 110a to control the engagement between the inlet member 114b and the inlet seat 114b.

Fluid flow through the valve body 112 and assembly 100 is preferably controlled by operation of the electrically control points E which are coupled to the chambers and ports of the valve body 112. Like the previously described embodiments of the assembly, the control points E are preferably operated by a controller in communication with the assembly 100 and/or are operated or controlled based upon monitored parameters from detectors or sensors T of the assembly 100 and/or detectors or sensors of the fire protection system. One electrically controlled point E11 is coupled to the fluid chamber port 130 and maintained normally open for communication with the fluid chamber 128. Another electrically controlled point E12 is maintained normally closed and coupled to the fluid chamber port 130 for controlling and/or maintaining fluid pressure in the fluid chamber 130. Like the previously described embodiments, a fluid control line 113 preferably places the fluid chamber 128 in fluid communication with the inlet 110a. Fluid pressure within the chamber 128 can be controlled by the movement of fluid in and out of the fluid chamber 128 through the alteration of the normally open and closed states of the first and second electrically controlled points E11, E12. In the normal state of the controlled points E11, E12 fluid pressure in the fluid chamber 128 acts on the inlet member 114b so that it is preferably biased and engaged with the inlet seat 114a to inhibit the flow of fluid from the inlet 110a to the outlet 110b.

More particularly, the control line 113 preferably includes one end in fluid communication with the inlet 110a and an opposite end in fluid communication with fluid chamber 128. The preferred first and second electrically operated solenoid valves E12, E12 are preferably in fluid communication with the control line 113 and coupled to the valve body 112 at a fluid chamber port 130 so as to control the flow of fluid in and out of the fluid chamber 128. The valve body 112 preferably includes an inlet port 122 proximate to and in fluid communication with the inlet 110a. In a preferred arrangement, the first electrically controlled solenoid valve E11 controls the fluid communication between the inlet port 122 to the fluid chamber 128. More specifically, the first solenoid valve E11 operates to control fluid delivered to the inlet 110a and redirected to the diaphragm chamber via the inlet port 122. Moreover, the first solenoid valve E11 operates to control the flow rate of fluid into the fluid chamber 128 to a desired rate. Alternatively or in addition to, the flow rate and direction of flow can be maintained in one direction from the solenoid valve E11 to the fluid chamber 128 and at the desired rate by a check valve 115 or other flow restriction disposed between the solenoid valve E1 and the fluid chamber 128. The second electrically operated solenoid valve E12 operates to control and maintain or relieve fluid pressure in the fluid chamber 128. The states of the controlled points E11, E12 can be electrically controlled in response to an appropriate control signal. The control points further preferably provide an electric latch that keeps the assembly open even in the event of power loss to the system. Accordingly, the preferred electric latch provides, in the event of a primary and secondary power loss, that the fluid chamber 128 does not re-pressurize and close the valve body 12 during a fire event. In the event of a power loss, the electric latch maintains the fluid control assembly 110 in the open position preferably until such time as the assembly is manually reset.

Although the valve body 112 can include a housing of a unitary construction, the valve body 112 can include a subassembly of multiple components to provide the preferred inlet, outlet, ports and chambers described herein. In the preferred embodiment shown in FIG. 2, the valve body 112 includes a diaphragm valve 112a and a check valve 112b coupled to the diaphragm valve 112a. The preferred diaphragm valve 112a includes an inlet opening, and internal diaphragm member and diaphragm seat to respectively provide the inlet 110a, inlet member 114b and inlet seat 114a. The body of the diaphragm valve 112 and diaphragm member 114b further preferably define the fluid controlled diaphragm chamber 128. The preferred check valve 112b preferably includes the outlet opening, an internal clapper and internal clapper seat to respectively provide the outlet 110b, outlet member 116b and the outlet seat 116a. An exemplary check valve is shown and described in TYCO FIRE PROTECTION PRODUCTS Technical Data Sheet, "TFP950: Model CV-1FR Riser Check Valves 2 to 12 Inch (DN50 to DN300" (October 2010). The check valve 112b is preferably coupled to the diaphragm valve 112a such that upon the clapper 116b engaging the clapper seat 116a and the internal diaphragm member 114b engaging the diaphragm seat 114a, the preferred intermediate chamber 118 is defined between the diaphragm and check valves seats 114a, 116a.

The preferred diaphragm valve and check valve 112a, 112b assembly define the preferred ports and chambers of the assembly 100 for periodic monitoring and fluid control. In the preferred arrangement, two electrically controlled solenoid valves E11, E12 are coupled to the diaphragm chamber 128 at the chamber port 130 to control the engagement of the diaphragm member 114b with the diaphragm seat 114a and provide the preferred electric latch previously described. The preferred check valve 112b defines an outlet port 124 proximate the outlet 110b and more preferably located between the outlet 110b and the clapper seat 116a. A first fluid detector T11 is preferably coupled to the outlet port 124 to detect any one of fluid pressure or flow at the outlet 110b. The fluid detector T11 can be electrically coupled to the first and/or the second solenoid valves E11, E12. In the preferred electric latch, the fluid detector T11 can be coupled to the outlet port 124 of the valve body 112 to detect the loss of pressure at the outlet 110b of the assembly 100. Upon detecting the loss in pressure, the first control point E11 is preferably closed to cease delivery of fluid to the diaphragm chamber 128. The second control point E12 can be controlled, independently or as a function of either detector T11 or the first control point E11, so as to open and relieve the fluid pressure from the fluid chamber 128. The reduction of the fluid pressure permits the inlet member 114b to disengage the seat 114a and permit the flow of fluid from the inlet to the outlet 110a, 110b of the assembly 100.

In one preferred embodiment, further preferably coupled to the outlet port 124 are one or more electrically controlled points E13, E14 to control the flow of a fluid through the outlet port 124 and outlet 110b. The third and fourth controlled points E13, E14 can be embodied as electrically operated solenoid valves. The third solenoid valve E13 is preferably normally closed and de-energized. Upon receipt of an appropriate control signal, the third solenoid valve E13 can be energized open to release fluid from the outlet 110b and outlet port 124 for flow to, for example, an external drain or atmosphere. The fourth solenoid valve E14 is preferably normally closed and de-energized. The fourth solenoid valve E14 preferably defines a known or desired orifice opening to permit the escape of fluid at a known rate. Upon receipt of an appropriate control signal, the fourth solenoid valve E14 can be energized open to release fluid from the outlet 110b and outlet port 124 for flow to, for example, to an external drain or atmosphere. Operation of the fourth solenoid valve E14 can be used to a perform a remote or periodic leakage test of the valve assembly 100 or to perform a remote or periodic trip test in a manner described herein.

The preferred diaphragm valve 112a further preferably defines an intermediate port 126 of the assembly 100 in communication with the preferred intermediate chamber 118. A second fluid detector T12 is preferably coupled to the intermediate port 126 to detect any one of fluid pressure or flow to preferably continuously or periodically monitor the intermediate chamber 118 for changes in atmospheric conditions. With the preferred assembly installed, increased fluid pressure at the detector T12 can indicate system operation or leakage at either or both of the inlet and outlet seats 114a, 116a. Further preferably coupled to the intermediate port 126 are one or more electrically controlled points E15, E16. The fifth and sixth controlled points E15, E16 can be embodied as electrically operated solenoid valves. The fifth solenoid valve E15 is preferably normally closed and de-energized. Upon receipt of an appropriate control signal, the fifth solenoid valve E15 can be energized open to release fluid from the intermediate chamber 118 for flow to, for example, an external drain or atmosphere. The sixth solenoid valve E16 is preferably in fluid communication with an inlet port 122 of the valve body 112, normally closed and de-energized. The sixth solenoid valve E16 can be used in a fluid flow alarm test. For example, upon receipt of an appropriate control signal, the sixth solenoid valve E16 can be energized open to provide for the flow of fluid from the inlet port 122 to the fluid detector T12. Fluid pressure or flow is detected by the fluid detector T12 at the intermediate port to signal, for example, an alarm to indicate fluid flow. To prevent the flow from the solenoid valve E16 to the intermediate chamber 118, the assembly 100 can include a check valve 117 between the fluid detector T12 and the intermediate port 117. At the conclusion of the fluid flow test, the solenoid valve E16 is subsequently signaled closed to stop the flow from the inlet port 122. The solenoid valve E15 is temporarily opened to relieve the fluid pressure in the line that is acting on the fluid detector T12.

The preferred diaphragm valve 112a also preferably defines the inlet port 122 proximate the inlet 110a and more preferably between the inlet 110a and the diaphragm seat 114a. A third fluid detector T13 is preferably coupled to the inlet port 122 to detect any one of fluid pressure or flow and for preferably continuously or periodically monitoring fluid conditions delivered at the inlet 110a of the assembly pressure for a given point of time. Further preferably coupled to the inlet port 122 are one or more electrically controlled points E17 to drain fluid from the inlet port 122. The seventh controlled point E17 can be embodied as an electrically operated solenoid valve. The seventh solenoid valve E17 is preferably normally closed and de-energized. Upon receipt of an appropriate control signal, the seventh solenoid valve E17 can be energized open to release fluid from the inlet port 122 for flow to, for example, an external drain or atmosphere. Further preferably coupled to the diaphragm chamber port 130 is a fourth fluid detector T14 for preferably continuously or periodically monitoring fluid conditions in the diaphragm chamber 128.

The preferred valve body and the control points E, sensors and/or detectors P. T are preferably coupled and arranged to provide for a compact assembly. Accordingly, in preferred embodiments of the assemblies of FIGS. 1 and 2, the fluid control assemblies can be encased within one or more housings or enclosures. Alternatively, the assemblies are not encased in an enclosure as shown. As schematically shown, the control points E, sensors and/or detectors P, T can be coupled directly to the valve body of the assembly or alternatively can be remotely coupled to the valve body by appropriate tubing or piping.

Figure 3:
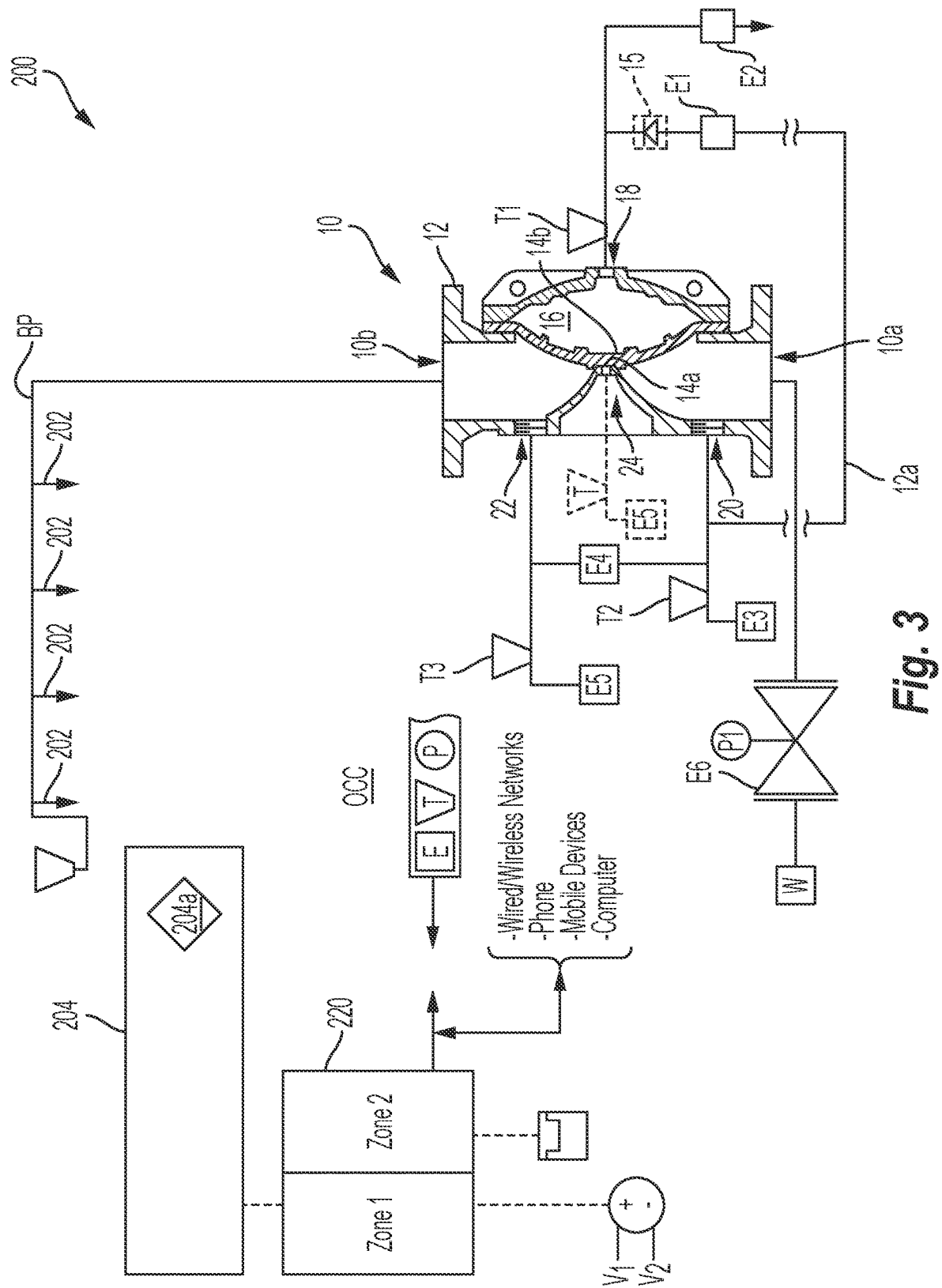
FIG. 3 is a schematic view of a preferred deluge system having the fluid control assembly of FIG. 1.

Shown in FIG. 3 is the preferred automatic fluid control assembly 10 of FIG. 1 installed in a deluge system 200. The preferred system 200 includes a plurality of open or unsealed fire protection sprinklers 202 to protect an occupancy OCC. The sprinklers 202 are interconnected by a network of pipes BP and open to atmospheric pressure in an unactuated state of the system 200. The piping described herein can include riser piping, main piping, cross-mains, branch piping, drops and sprigs. The system 200 includes a plurality of preferably electric fire detectors 204 including any one of but not limited to heat detectors, smoke detectors, or manual pull stations. The fire detectors 204 are preferably electrically coupled or connected to a preferably centralized controller 220 for receipt of detection data or signals from the detectors 204. The centralized controller 220 can be networked for remote access by and communication with operating or maintenance personnel or external agencies.

The system 200 includes a primary fluid source of firefighting fluid W such as, for example, a water supply main. The system 200 includes a preferred embodiment of the automatic fluid control assembly 10 of FIG. 1 to provide a riser which interconnects and controls the flow of fluid from primary fluid source W to the network of pipes BP and the fire protection sprinklers 202. The system 200 can be alternatively configured with the assembly 100 of FIG. 2 provided the assembly is controlled and operated in a manner as described herein. The automatic fluid control assembly 10 is preferably coupled to the water by the service control valve E6 at the inlet 10a of the assembly 10. The outlet 10b is preferably piped or connected to the network of pipes BP. Water is delivered to the inlet 10a and the preferred fluid chamber or more preferably diaphragm chamber 16 so that the diaphragm member 14b engages the valve seat 14a to form a fluid tight water seat in an unactuated state of the system 200. In the preferred arrangement water delivered to the inlet 10a flows through the inlet port 20 and through the normally open first electrically controlled point E1 via the control line 12a to fill and pressurize the fluid or diaphragm chamber 16.

The detectors and sensor T, P and preferred electrically controlled points E of the preferred fluid control assembly 10 are coupled to the controller 220 to provide for the desired monitoring, operation, control, set-up and reset of the automatic fluid control assembly 10 in each of the unactuated, actuated and post-actuation states of the system 200. The preferred detectors and sensors T, P and the electrically controlled points E of the preferred systems can provide for remote automatic monitoring, control, operation, testing, set-up, or maintenance; and additionally or alternatively, the preferred systems can provide for periodic automatic monitoring, control, operation, testing, set-up or maintenance. Moreover, to facilitate the installation of the assemblies described herein, the assemblies can include one electrically controlled point E6 upstream of the inlet 10a of the assembly 10 as seen in FIG. 3 and where applicable include a second electrically controlled point E9 downstream of the outlet 10b of the fluid control assembly 100 as seen, for example, in FIG. 5. The upstream electrically controlled point E6 can be embodied as a service control valve (SCV) or a post indicator valve (PIV) coupled to a first position sensor P1 to preferably evaluate the valve position over time, periodically or continuously, preferably in connection with the controller 220 in order to track abnormal closing or partial closing that could affect performance of the SCV valve E6. The downstream electrically controlled point E9 of FIG. 5 can be embodied as a shut-off valve SOV coupled to a second position sensor P2 to preferably evaluate the valve position over time, periodically or continuously, preferably in connection with the controller 420 in order to track abnormal closing or partial closing that could affect performance of the shut-off valve E9. The upstream and downstream valves can facilitate the installation of the preferred assemblies in either a new installation or an existing installation to provide the preferred fluid control and operation methodologies described herein. Moreover, the preferred upstream and downstream valves can provide for a temporary installation in order to, for example, troubleshoot an existing fire protection system.

Referring again to system 200 of FIG. 3, the valve body 12 actuates or trips to open and deliver water to one or more sprinklers 202 in the event of a fire. For the preferred deluge system, at least one fire-indicating condition actuates the automatic fluid control assembly 10. Accordingly, the controller 220 defines at least one zone of the controller 220 and can preferably define more than one zone which is to be triggered to actuate the assembly 10. In a preferred operation, the fire detectors 204 notifies the first zone Zone 1 at the controller 220 which signals or de-energizes the first solenoid valve E1 so that that the valve closes and fluid ceases to flow into and pressurize the diaphragm chamber 16. Preferably substantially simultaneously, the first zone Zone 1 at the controller 220 signals operation of the preferably normally closed second electrically controlled point or solenoid valve E2. The valve E2 is opened to relieve fluid pressure from the preferred fluid or diaphragm chamber 16 to disengage the diaphragm member 14b from the seat 14a. Fluid fed to the inlet 10a is permitted to flow to the outlet 10b. The second solenoid valve E2 can be alternatively coupled to the first solenoid E1 valve such that upon the first solenoid valve E1 being de-energized in response to a fire detection condition, the second solenoid valve E2 is energized open. Alternatively, the two solenoid valves E1, E2 can be coupled to one another such upon the second solenoid valve E2 being energized open in response to a fire condition, the first solenoid valve E1 is de-energized closed.

Further in the alternative, the automatic control assembly 10 provides that the first solenoid valve E1 controls or regulates the fluid flow into the diaphragm chamber 16 to fluid flow that is less than the fluid flow out of the diaphragm chamber upon the second solenoid valve E2 being energized open. As previously described, the control line 12a can include a check-valve or restriction 15 to control the feed rate into the diaphragm chamber. In one preferred embodiment of the assembly operation following fire detection, the first zone Zone 1 at the controller 220 signals operation of the preferably normally closed second electrically controlled point or solenoid valve E2. The valve E2 is opened to relieve fluid pressure from the preferred fluid or diaphragm chamber 16 to disengage the diaphragm member 14b from the seat 14a. With the first solenoid E1 still energized, the feed rate is less than the discharge rate from the diaphragm chamber 16, and the diaphragm member 14b disengages the seat 14a under the reduced fluid pressure. Operation of the fluid control assembly 10 allows for the delivery of water from the inlet 10a to the outlet 10b and the open sprinkler(s) 202. The water flow is preferably detected by the outlet port fluid detector T3 to validate that the system 200 is flowing water. Fluid pressure detected at the outlet port detector T3 de-energizes and closes the solenoid valve E1 which stops the feed of water into the diaphragm chamber 16. With the diaphragm chamber 16 effectively depressurized, the fluid control assembly 10 is wide open for full flow from inlet 10a to outlet 10b.

Regardless of the manner in which the first and second solenoid valves E1, E2 operate, the solenoid valves U 1, E2 preferably provide for an electric latch that prevents water from re-pressurizing the fluid chamber 16 and the reengagement of the inlet member 14b and inlet seat 14a following system actuation even in the event of a loss of power. As shown in FIG. 3, the preferred system 200 includes primary power source V1, such as for example an AC voltage source, and a secondary back-up power source V2, such as for example a battery back-up. The preferred electric latch provides that, in the event of a primary and secondary power loss, the preferred diaphragm chamber 16 does not re-pressurize and close the diaphragm valve 12 during a fire event. The actuated assembly 10 preferably remains in the open condition until such time the system is manually reset.

The assembly 10 further preferably provides for remote and/or automatic resetting of the system 200 following system actuation by appropriate controlled operation of the first and second controlled points E1, E2. The system 200 and assembly 10 preferably includes one or more resetting detectors. For example, the system detectors 204 can include resetting heat detectors 204a that signal when the heat release is sufficiently low in the occupancy OCC to signal that the fire is sufficiently addressed, controlled or extinguished to initiate reset of the control assembly 10. Following a preferably prescribed time after system actuation such that the heat from the fire has sufficiently diminished, the resetting detectors 204a preferably signal to the controller for a reset. The resetting procedure described herein can be performed automatically or alternatively can be initiated by an appropriate switch or push-button signal from a local or remote operator. The resetting detectors 204a preferably signal the controller 220 to initiate a system reset and the controller signals for the second electrically controlled solenoid valve E2 to de-energize closed. The controller 220 then signals for the first electrically controlled solenoid valve E1 to open so that fluid is delivered to pressurize the diaphragm chamber 16 to bias the diaphragm member 14b into sealed engagement with the seat 14a to stop the flow of water into the system piping. As previously described, the solenoid valve E1 and/or the control line 12a is configured to define a desired flow rate for the fluid fed into the diaphragm chamber 16, which can define the rate at which the diaphragm is fully pressurized to form the sealed engagement between the seat 14a and the diaphragm member 14b. Accordingly, the control line 12a and the associated solenoid valve E1 can define the time for closing or re-setting of the fluid control assembly 10 from its fully open position. The outlet port electrically controlled valve E5 is preferably signaled or operated open by the controller 220 to drain the system piping of water. When the outlet fluid port detector T3 indicates 0 psig, the outlet port electrically controlled valve E5 is closed. All control points E and detectors T are evaluated for leakage including seat leakage, and notification of a satisfactory reset is preferably provided for communication to a system operator locally or remotely. Should the fire reignite, the entire actuation and reset process repeats as necessary.

The preferred automatic fluid control assemblies described herein can be installed in different type of fire protection systems such as for example: dry systems or wet systems, including the deluge system as previously described, dry pipe systems, or preaction systems including non-interlock, single-interlock, or double-interlock preaction systems (with or without quick opening devices). Alternate embodiments of the fluid control assembly can also employ the preferred fluid chamber and electrically operated control points E1, E2 to control fluid flow in and out of the chamber 16 through the assembly inlet and outlet. However, the alternate embodiments can also use alternate valve configurations and alternate detection and signaling schemes to provide for a preferred valve assembly and operation that can be used in other types of fire protection systems, such as for example, preaction or dry pipe fire protection systems.

Figure 4:
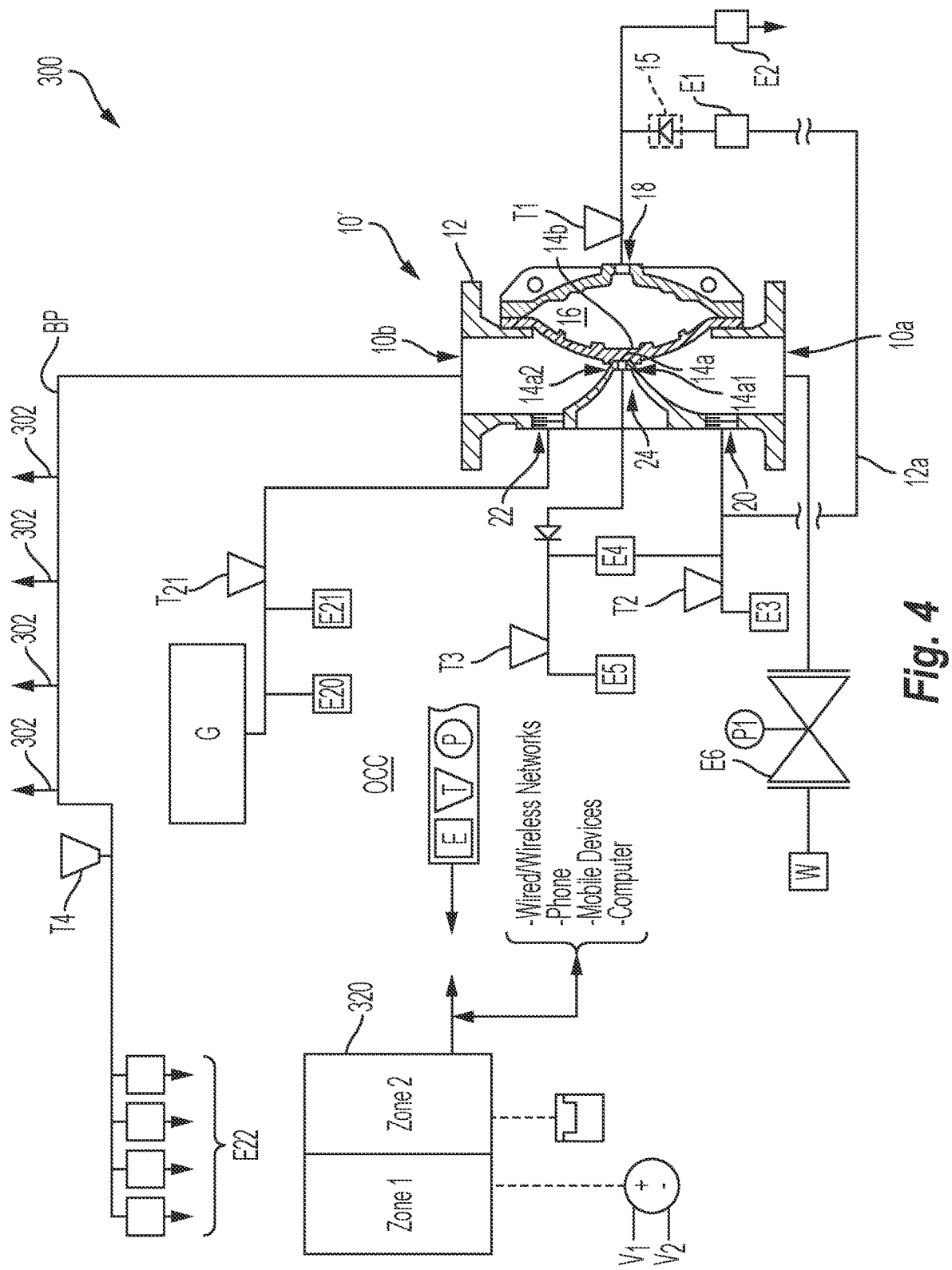
FIG. 4 is a schematic view of a preferred dry pipe system having an alternate embodiment of the fluid control assembly of FIG. 1.

Shown in FIG. 4 is a preferred dry pipe fire protection system 300 that incorporates the alternate fluid control assembly 10' with the valve body 12 alternatively defining the intermediate port 24 and the intermediate chamber formed between the inlet and outlet seats 14a1, 14a2. The preferred dry pipe system 300 includes automatic sprinklers 302 that are normally closed in an unactuated state. The system 300 includes a primary fluid source and a secondary fluid source coupled to the interconnected network of fire protection sprinklers 302. The primary fluid source is the source of firefighting fluid W such as, for example, a water supply main. The secondary fluid is preferably a source of compressed gas G such as, for example, a compressed air supply or nitrogen to fill the network of pipes BP in an unactuated state of the system 300. The gas is preferably fed into the network of pipes through the outlet port 22 of the valve body 12 and the outlet 10b. The diaphragm member 14b and outlet seat 14a2 form a fluid tight air seat in the unactuated state of the assembly 10's to seal in the compressed gas at the outlet 10b. Preferably disposed along the gas feed line and coupled to the outlet port 22 are two electrically operated solenoid valves E20, E21 and the fluid detector T21 to monitor the fluid conditions at the outlet 10b including any changes in gas pressure and/or flow. A fluid detector T3 is preferably coupled to the intermediate port 24 to monitor fluid conditions in the intermediate chamber between the inlet and outlet seats 14a1, 14a2.

In the event of a fire, one or more of the sprinklers 302 will operate and release the gas within the pipes BP. The piping fluid detector T21 detects the change in pressure or flow within the interconnecting pipes BP and signals the second solenoid valve E2 to open through the control unit 320. In the embodiment shown, the control line 12a includes the unidirectional check-valve or restriction 15; and thus, water from the second solenoid valve E2 is discharged at a rate greater than is provided from energized first solenoid valve E1 to pressurize the diaphragm chamber 16. Accordingly water flows from the inlet 10a to the outlet 10b. Alternatively, the assembly 10' can be tripped by the change in states of the first and second solenoid valves E1, E2 in any manner previously described. Water detected at the intermediate chamber by the outlet detector T3 signals closure of or de-energizes the first solenoid valve E1 to permit the valve body 12 to fully open. In addition to initiating trip of the fluid control assembly, the outlet port fluid detector T21 can provide an accelerator or quick opening in the system by actuating the system based upon the predetermined or set threshold rate of decay in gas pressure which defines an open sprinkler condition. For example, the detector 121 in combination with the controller 320 can define a threshold rate of decay in gas pressure in the piping BP, such as for example −0.1 psi/sec. drop, which defines an actuated sprinkler condition. Upon detecting the threshold rate, the controller 320 can signal operation of the second solenoid valve E2 to relieve fluid pressure in the diaphragm chamber 16 and initiate actuation of the automatic valve assembly 10'. Moreover, the assembly 10' and controller 320 can incorporate algorithms for detection of an open sprinkler condition as shown and described in U.S. Pat. No. 5,971,080, to provide for a desired system response time such as for example an accelerated response time.

Preferably disposed along the pipes BP is a fluid detector T4 for preferably continuously or periodically monitoring the secondary fluid for changes in pressure and/or flow. The fluid detector T4 is preferably located at an end-line of the piping or hydraulically remote portion of the network of pipes to detect the fluid end-head pressure in the hydraulically remote location. The fluid detector T4 can convey the collected data to the controller 320 and to remote personnel for use, for example, to detect the end-head pressure of water delivered to the remote portion of the sprinkler pipes BP and for determining the fluid delivery time of water. The fluid detector T4 can be used in conjunction with the inlet port fluid detector T2 and the controller 320 to determine pressure versus time relationship for the system 300 to fill with water and time to stabilization for the number of open sprinklers (i.e., when end head pressure is stabilized). Also, preferably disposed along a most hydraulically remote portion of the system 300 can be one or more electrically operated solenoid valves E22 that can be controlled or signaled to operate simultaneously or sequentially to release gas from the network of pipes in order to perform, for example, a remote trip test or for remotely verifying water delivery time.

Figure 5:
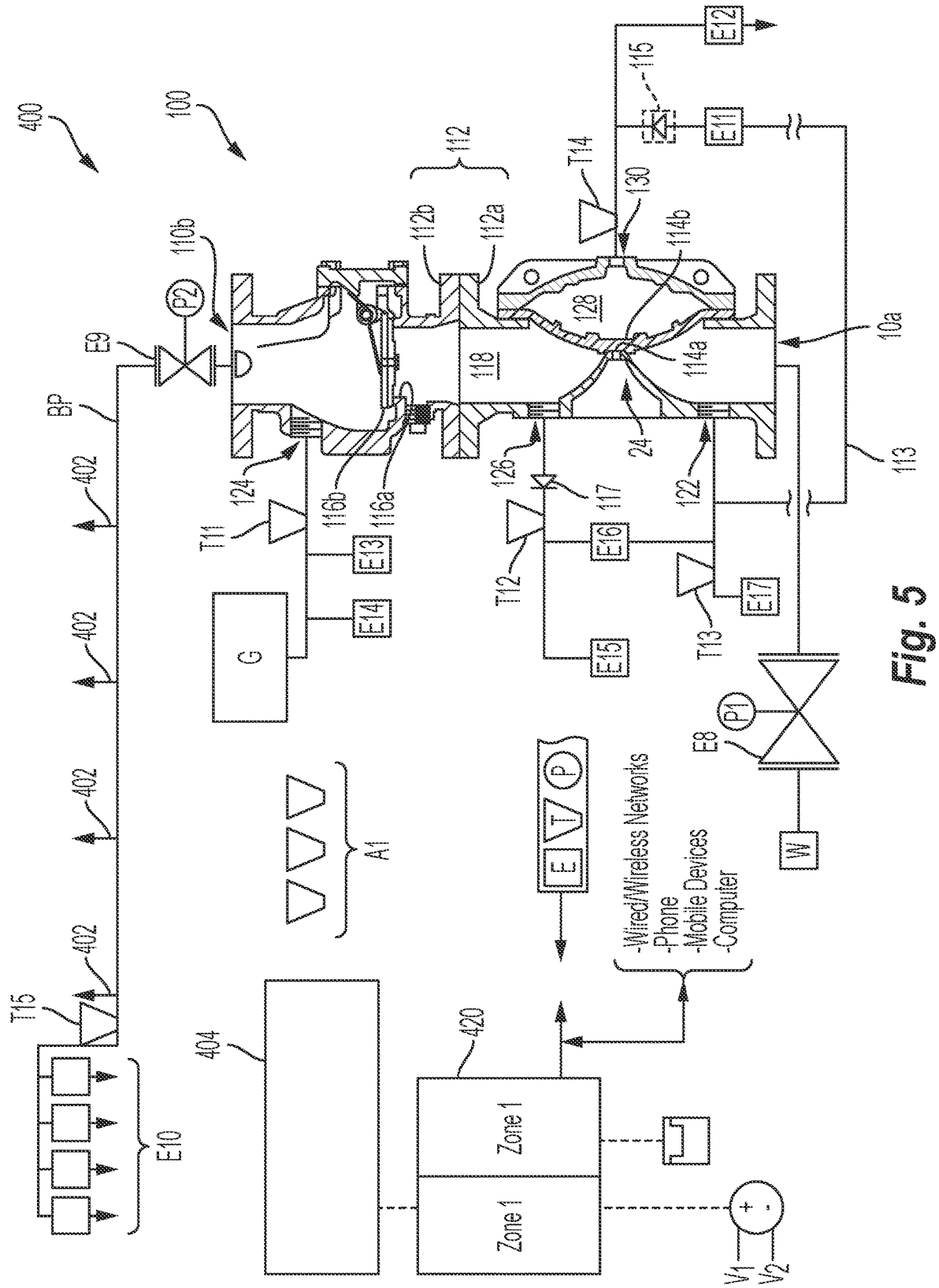
FIG. 5 is a schematic view of a preferred double-interlock preaction system having the fluid control assembly of FIG. 2.

Shown in FIG. 5 is a preferred double-interlock preaction system 400. The preferred system 400 includes a plurality of automatic fire protection sprinklers 402 to protect an occupancy OCC interconnected by a network of pipes BP. The system 400 includes a plurality of preferably electric fire detectors 404 including any one of but not limited to heat detectors, smoke detectors, or manual pull station. The fire detectors 404 are preferably electrically coupled or connected to the preferably centralized controller 420 for receipt of detection data or signals from the detectors 404. The system 400 can also preferably include one or more ambient temperature detectors A1 for use in water delivery time determinations, system troubleshooting or performance validations as described herein.

The system 400 includes a primary fluid source and a secondary fluid source coupled to the interconnected network of fire protection sprinklers 402. The primary fluid source is a source of firefighting fluid W such as, for example, a water supply main. The secondary fluid is preferably a source of compressed gas G such as, for example, a compressed air supply or nitrogen, to fill the network of pipes BP in an unactuated state of the system 400. The system 400 includes a preferred embodiment of the automatic fluid control assembly 100 of FIG. 2 to provide an automatic fluid control assembly which interconnects and controls the flow of fluid from primary and secondary fluid sources W, G to the network of pipes BP and the fire protection sprinklers 402. The fluid control assembly 100 is preferably coupled to the water by the service control valve E8 and coupled to the network of pipes BP by the shut-off valve E9. The secondary gas supply G is preferably coupled to the outlet port 124 of the valve body 112. The compressed gas G fills the piping network BP and acts on the outlet member 116b so that the member engages the seat 116a to form a fluid tight air seat of the valve control assembly 100 in an unactuated state of the system 400. Water is delivered to the inlet 110a and the preferred fluid chamber 128 or more preferably diaphragm chamber 128 so that the inlet/diaphragm member 114b engages the inlet seat 114a to form a fluid tight water seat in an unactuated state of the system 400. In a preferred arrangement, water delivered to the inlet 110a flows through the inlet port 122 and through the normally open first electrically controlled point E11 to fill and pressurize the fluid or diaphragm chamber 128. With the air and water seats formed, the intermediate chamber 118 is preferably maintained under atmospheric pressure.

The detectors and sensors T, P and preferred electrically controlled points E of the flow control assembly 100 are coupled to the controller 420 to provide for the desired monitoring, operation and control of the fluid control assembly 100 in each of the unactuated, actuated and post-actuated states of the system 400. In the event of fire, the valve body 112 actuates or trips to open each of the air and water seats to deliver water to one or more actuated sprinklers 402 to address the fire. For a double-interlock preaction system 400, two fire-indicating conditions are required to actuate the valve assembly 100. Accordingly, the controller 420 defines two zones which are to be triggered to actuate the valve assembly 100. In a preferred operation due to a fire condition, the fire detectors 404 notifies the first zone Zone 1 at the controller 420. The subsequent thermal actuation of a fire protection sprinkler 402 relieves air pressure from the network of pipes BP and relieves the air pressure acting on the outlet member 116b of the assembly 100. The outlet port fluid detector T11 or other fluid/pressure detector along the network of pipes BP detects the loss of pressure and signals the second zone Zone 2 of the controller 420. With the two zones Zone 1 and 2 of the controller activated, the controller 420 signals operation of the preferably normally closed second electrically controlled point or solenoid valve E12 to open to relieve pressure from the preferred fluid or diaphragm chamber 128 to disengage the inlet or diaphragm member 114b from the inlet seat 114a. In the embodiment shown, the control line 113 includes the check-valve or other unidirectional restriction 115; and thus, water from the second solenoid valve E12 is discharged at a rate greater than is provided from energized first solenoid valve E11 to pressurize the diaphragm chamber 128. Accordingly water flows from the inlet 110a to the outlet 110b. Alternatively, the assembly 100 can be tripped by the change in states of the first and second solenoid valves E11, E2 in any manner previously described. The water flow is preferably detected by the intermediate chamber port fluid detector T12 to validate that the system 100 is flowing water. Fluid pressure detected at the intermediate chamber port detector T12 also de-energizes and closes the first electrically controlled point or solenoid valve E11 to prevent water from feeding the diaphragm chamber 128 and allowing the fluid control assembly 100 to fully open. Moreover, the respective controlled closure and opening of the first and second solenoid valves prevents re-pressurizing the fluid chamber 128 and the reengagement of the inlet member 116b and inlet seat 116a. Again, the preferred valve assembly 100 provides that the preferred diaphragm chamber 128 does not re-pressurize and close the diaphragm valve 112a during a fire event in which there is a primary and/or secondary power loss. In the event of a power loss, the electric latch maintains the fluid control assembly 100 in the open position preferably until such time as the assembly is manually reset.

Alternatively, remote or automatic resetting of the valve assembly 100 can be provided by appropriate operation of the first and second controlled points or preferred solenoid valves E11, E12. In one preferred method of resetting the system, the second solenoid valve E12 is closed and the first solenoid valve E11 is opened to pressurize the diaphragm chamber 128. When the fluid detector T14 at the diaphragm chamber detects a stable pressure, the preferred solenoid valves E14, E15 at the outlet and intermediate chamber ports 124, 126 are opened to drain the system piping BP. In one preferred embodiment of, once the outlet port fluid detector T11 indicates no pressure (0 psig), a notification is preferably given to appropriate personnel at the controller 420 or remotely therefrom to replace any operated sprinklers 402.

The outlet and intermediate chamber solenoid valves E14, 15 are then closed and the system piping BP is permitted to re-pressurize with the compressed gas G to the system unactuated operating pressure. When the outlet port fluid detector T11 indicates proper system pressure for the unactuated state, the controller 420 is preferably reset and a notification is sent to appropriate personnel of a satisfactory system reset.

During the actuation or tripping of the system 400, the inlet port fluid detector T13 in combination with the controller 420 monitors and records the fluid pressure over time. It is anticipated that the pressure significantly drops when the valve body 112 first operates and then as the rest of the assembly 100 and network of pipes BP fills with water, the pressure increases and stabilizes for the number of open sprinklers (i.e., end head pressure is stabilized). The controller 420 with the inlet port fluid detector T13 can determine the time to stabilization of water pressure, which can be used to help validate calculated water delivery times using fluid delivery time software. The water delivery time is defined as the time from the operation of the fluid control valve or assembly to the moment of delivery to an open sprinkler at operating pressure.

In the unactuated state of the system 400, the inlet port fluid detector T13 preferably in combination with the controller 420 preferably periodically or continuously monitors the water supply for any one of pressure for a given point of time, variation in pressure over time, average pressure over time, pressure surges, and pressure drops. The pressure spikes or variations can be evaluated to identify the potential for such spikes or variations to cause false trips or other problems of the assembly 100. Pressure drops at the inlet port 122 can be evaluated to determine if there is inadequate water pressure for proper system operation in event of a fire. Any detected over pressure variation or spikes at the inlet fluid detector T13 and the controller 420 could be used to determine the need for system adjustments in order to prevent false trips. In another example, static and average water supply pressure can be automatically measured by the inlet fluid detector T13 at predetermined frequency, such as for example, quarterly. Moreover, the inlet fluid detector T13 can provide at a desired frequency, e.g., quarterly, a static and/or an average water supply pressure output for documentation. In one preferred aspect, the inlet solenoid valve E17 can be opened and then inlet fluid detector T13 to provide a residual pressure determination for output and documentation; the inlet solenoid valve E17 is subsequently closed. The fluid values can be compared to readings when the system 400 was first placed in service. Evaluation of the readings below the initial or "normal" values can define a recordable event that indicates an impaired water supply may affect system performance.

In the unactuated state of the system 400, the intermediate port fluid detector T12 preferably periodically or continuously monitors the intermediate chamber 118 for an atmospheric pressure condition being present. Detection of increased fluid pressure at the intermediate port 126 and chamber 118 can indicate that the valve body 112 has an internal leak. A detected pressure at the detector T12 equal to the inlet fluid detector T13 can indicate that the system has tripped when the solenoid valve E16 between the fluid detector T12 and the inlet port 122 is in the normal closed position. A detected pressure above atmospheric at the intermediate port fluid detector T12 can also indicate leakage at either the water seat leakage or air set leakage. If the intermediate port fluid detector T12 senses an incremental pressure, the associated electrically operated solenoid valve E15 can temporarily open to relieve pressure until the event is corrected. The rate at which the detected increases pressure over time, as sensed by the detector T12, can be indicative of the size of the leak at the seat(s) 114a, 116a. The intermediate electrically operated solenoid valve E15 is preferably normally closed and preferably signaled opened intermittently to relieve a level or rate of increased fluid pressure as detected by the fluid detector T12. Accordingly, the intermediate port fluid detector T12, solenoid valve E15 and controller 420 can provide for an electric automatic drain valve that can be coupled with remote communication to provide or enhance remote system testing, operation, monitoring, maintenance and/or set-up of the valve assembly 100 and system 400 or any other system in which it is desirable to remotely regulate the internal pressure. By sensing for a seat leakage, the fluid detector T12 with controlled operation of the solenoid valve E15 can prevent false waterflow alarms and possible system trips.

Moreover, the preferred automatic fluid control assemblies can validate proper trip conditions and non-trip conditions of the double-interlocked system 400. For example, should a detector 404 inadvertently operate or an electric pull station be opened, the first Zone 1 of the controller 420 would be activated, but would not signal open the second solenoid valve E12 thereby preventing an unnecessary trip of the system. The intermediate port fluid detector T12 can validate the non-trip or unactuated condition by continuously reading a normal atmospheric pressure. Similarly, the intermediate port fluid detector T12 can validate another non-trip or unactuated condition of the system where a sprinkler is accidentally opened or broken away from the pipes BP by a non-fire condition. For example, should a sprinkler 302 be accidentally opened by accidental contact with a forklift, a loss of air pressure in the network of pipes BP will result. Outlet fluid detector T12 would activate Zone 2 of the controller 420, but the controller 420 would not signal open the second control solenoid valve E2 thereby preventing an unnecessary trip of the system. Again, the intermediate port fluid detector T12 can validate the non-trip or unactuated condition by continuously reading a normal atmospheric pressure.

The intermediate port fluid detector T12 can also provide for water flow validation or provide a preferred non-mechanical "water flow alarm." Validation can be conducted at a predetermined frequency in which the solenoid valve E16 is opened and the pressure monitored by the intermediate port fluid detector T12. The fluid pressure is monitored to determine or verify that the fluid pressure increases from atmospheric to equivalent of the inlet pressure detected at the inlet fluid detector T13. The detected change in fluid pressure can be signaled as a "water flow alarm" at the controller 420 for notification to operating or maintenance personnel locally or remotely. Once the periodic test is concluded the intermediate solenoid valve E16 can be closed and the other solenoid valve E15 can be signaled to be temporarily opened to drain the interconnected lines. The intermediate fluid detector T12 can preferably provide a documented history of the water flow alarm test.

In the unactuated state of the system 400, the fluid or diaphragm chamber detector T14 in connection with the controller 420 at the preferred diaphragm chamber port 130 preferably periodically or continuously monitors the diaphragm chamber 128 water supply for any one of pressure for a given point of time, variation in pressure over time, average pressure over time, pressure surges, and pressure drops. The detected diaphragm chamber pressure is preferably continuously compared to the pressure detected by the inlet port detector T13. Differences in the two pressures can be used to evaluate conditions leading up to an inadvertent and unexplained tripping of the system.

In the unactuated state of the system 400, the outlet port fluid detector T11 in combination with the controller 420 preferably periodically or continuously monitors the system air or gas pressure for any one of: pressure for a given point of time, variation in pressure over time, average pressure over time, pressure surges, and/or pressure drops. Monitoring the loss of air pressure over time can be evaluated to determine or validate operation of a sprinkler 402 versus a leak in the system piping BP. Detection of a decay or decreasing pressure at the outlet port 124 at a rate greater than what is capable of being automatically replenished by the compressed gas supply G, with the intermediate chamber pressure at a normal atmospheric condition, and in the absence of a detected fire by the detectors 404 can be used to indicate inadvertent operation of a sprinkler 402. The rate of change over time at the outlet port fluid detector T11 can be compared and evaluated against other collected data such as for example the ambient temperature changes detected by sensor(s) A1 to validate an inadvertent sprinkler operation as compared to a proper thermally actuated sprinkler response to a fire.

Moreover, the outlet port fluid detector T11 can monitor and validate the compressed gas supply G for proper system operation. For example, at a predetermined frequency, e.g., quarterly, the outlet fluid detector T11 monitors air pressure at the outlet 110b and the electrically operated solenoid valve E14 is opened to slowly decrease air pressure. At a predetermined low air setting, for example at the controller 420, a low air alarm can be signaled and the low air condition validated. The outlet port solenoid valve E14 can then be signaled to a closed position, and the outlet fluid detector T11 can validate or verify that the air supply in the network of pipes BP is automatically returned to a normal operating pressure. The fluid detector T11 can be used to provide documented history of both the low air testing and automatic air supply testing.

The preferred automatic fluid control assembly 100 can also provide for other remote testing of the system 400 and its various operational components. More particularly, the fluid control assembly 100 can provide for remote trip testing of the system 400 without flooding the system with the water or other firefighting fluid. In the preferred method, the shut-off valve E9 is preferably electrically signaled closed and the second electrically operated solenoid valve E14 at the outlet port 124 is signaled opened. Upon release of a sufficient amount or decay in the air pressure, the outlet fluid detector T11 can provide for a low pressure actuation signal at the second zone Zone 2 of the releasing panel or controller 420 to indicate proper system operation for low pressure detection and actuation. The controller 420 can record a proper non-water flow condition upon the loss of air (sprinkler) only in which the first zone Zone 1 of the panel in activated. To detect proper system detection of air pressurization, the second outlet valve E14 can be signaled closed to permit the delivered gas or air from source G to pressure the outlet 110b of the assembly 100. The fluid detector T11 can detect and signal a proper gas pressure condition in the network of pipes BP. A proper non-flow condition for the double-interlock system 400 can be tested in which there is a fire detection signal but no loss in air pressure. The first zone Zone 1 of the controller 420 is activated to simulate a fire detection. Without the second zone Zone 2 activated, the preferred diaphragm chamber fluid detector T14 detects and signals that there is no waterflow or change in chamber pressure. The controller 420 can record a proper non-flow condition on a first zone Zone 1 activation or simulated fire detection only.

In the preferred remote trip test, the sprinkler piping BP is not filled with water and maintains its internal gas pressure as detected by the piping fluid detector T15. To perform the test, each of the first and second zones Zone 1, Zone 2 is activated. More specifically, zone Zone 1 of the controller 420 is remotely activated to simulate a fire and the first output solenoid valve E13 is signaled open to release air from the outlet and simulate an actuated sprinkler and activate the second zone Zone 2 of the controller 420. Accordingly, the first solenoid valve E11 can be de-energized closed and the second solenoid valve E12 signaled open to relieve pressure from the diaphragm chamber 128 so as to trip the assembly 100 and deliver water from the inlet 110*a* to the outlet 110*b* and out the outlet solenoid valve E13. Water flow and/or pressure detected by intermediate chamber fluid detector T12 validates the proper fluid flow and signals the controller 420 accordingly.

Under the preferred remote trip test, the diaphragm valve 112*a* is reset and system pressurization is verified. Thus, the second solenoid valve E12 is closed and the first solenoid vale E11 is energized open to pressurize the diaphragm chamber 128 to stop the flow of water from the inlet 110*a* to the outlet 110*b*. Once the inlet fluid detector T13 indicates stable pressure, the first output solenoid valve E13 is closed and the outlet 110*b* is automatically pressurized with air from source G. When the outlet fluid detector T11 signals normal system pressure and is preferably substantially equivalent to the pressure detected by the fluid detector T15 along the branch pipes BP, the system shut-off valve E9 is opened. All fluid detectors are evaluated for stability and any fluid leakage. With the trip test satisfactorily completed, the controller 420 preferably records proper detection and response by the assembly 100 to a simulated fire and sprinkler operation.

Again, as previously described, the electrically operated control points or solenoid valves E can be used to provide a quick opening device or accelerator of a system. For example, the outlet port fluid detector T11 can monitor the decay in gas pressure within the branch pipe to the threshold level at which a low air activation of the controller 420 at zone 2 should take place. The detector T11 in combination with the controller 420 can define a threshold rate of decay in gas pressure in the piping BP, such as for example −0.1 psi/sec. drop, which defines an actuated sprinkler condition. Upon detecting the threshold rate, the controller 420 can signal operation of the second solenoid valve E12 to relieve fluid pressure in the diaphragm chamber 16 and initiate actuation of the automatic valve assembly 10'. Moreover, the assembly 10 and controller 320 can incorporate algorithms for detection of an open sprinkler condition as shown and described in U.S. Pat. No. 5,971,080, to provide for a desired system response time such as for example an accelerated response time. Additionally, the system 400 can include one or more including up to four electrically operated solenoid valves E10 disposed along the branch line BP and coupled to the centralized controller 420. The solenoid valves E10 are preferably disposed at the end or along the most hydraulically remote portion of the piping BP. The solenoid valve (s) E10 can be signaled and operated at a predetermined frequency, e.g., quarterly, and the valve(s) E10 can be signaled for simultaneous or sequential operation to test the response of the system to air loss. Upon operation of the solenoid valve E10, the outlet port fluid detector T11 can monitor the decay in gas pressure within the network of pipes. The centralized controller 420 can compare the test results to those prior to validate proper operation of the low threshold activation which defines the accelerated operation of the system.

The system 400 preferably includes the fifth fluid detector T15 proximate the sprinklers 402 and along the network of pipes BP and preferably at a remote location from the automatic fluid control assembly 100 and more preferably proximate the solenoid valves E10, which can serve as an inspector's test connection. In the unactuated state of the system 400, the fluid detector T15 in connection with the controller 420 preferably periodically or continuously monitors the system compressed gas or air for any one of pressure for a given point of time, variation in pressure over time, average pressure over time, pressure surges, and pressure drops. In addition to its use in the remote trip test, the fluid detector T15 can convey the collected data to the controller 420 and to remote personnel for use, for example, to detect the end-head pressure of water delivered to the remote portion of the sprinkler pipes BP and for determining the fluid delivery time of water. The fifth fluid detector T15 can be used in conjunction with the inlet port fluid detector T13 and the controller 420 to determine pressure versus time relationship for the system 400 to fill with water and time for stabilization for the number of open sprinklers (i.e., when end head pressure is stabilized). The time for stabilization can be reported remotely for validating water delivery times for systems calculated using fluid delivery time software.

The ambient temperature sensor(s) A1 in connection with the controller 420 preferably periodically or continuously monitor the ambient temperature for the protected area OCC for any one of a given point in time, variation of ambient temperature over time, and average ambient temperature over time. For dry systems, the gas pressure within the pipes BP can be a function of the ambient temperature of the occupancy OCC. Because water delivery time is a function of gas pressure in the system piping, the water delivery time can be a function of the ambient temperature. Accordingly, the detected ambient temperatures can be combined with fluid flow or pressure readings from fluid detector T15 for communication to remote personnel to determine or evaluate the fluid delivery time. Moreover, the temperature profiles from the detected ambient temperatures can be compared to the pressure changes or profiles recorded by the fluid detectors T11, T15 at each of the outlet port 124 and at the preferred remote location along the network of pipes BP. The comparative data can be used to evaluate, troubleshoot, validate and/or compare and contrast calculated water delivery times under assumed ambient conditions to water delivery times determined under actual conditions.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A fluid control assembly, comprising:
    a first solenoid valve coupled with a diaphragm port of a diaphragm valve, the first solenoid valve to change, responsive to a first electrical signal, from a first open state allowing fluid flow into the diaphragm port from a first fluid line to a first closed state preventing fluid flow into the diaphragm port from the first fluid line;

a second solenoid valve coupling the diaphragm port with a second fluid line extending to a vent, the second solenoid valve to change, responsive to a second electrical signal, from a second closed state preventing fluid flow from the diaphragm port out of the vent through the second fluid line to a second open state allowing fluid flow out through the second fluid line; and a controller to transmit the first electrical signal responsive to detection of a fire condition and transmit the second electrical signal responsive to detection of the fire condition, the controller to detect the fire condition responsive to a detection signal from a fluid detector coupled with an outlet side of the diaphragm valve, the detection signal indicating at least one of pressure or flow rate.

2. The fluid control assembly of claim 1, comprising:
the fluid detector is a first fluid detector, the fluid control assembly comprising a second fluid detector between the diaphragm port and the first solenoid valve.

3. The fluid control assembly of claim 1, comprising:
a third solenoid valve coupled with an inlet port of the diaphragm valve, the first fluid line coupled with the inlet port.

4. The fluid control assembly of claim 1, comprising:
a fourth solenoid valve coupled with an outlet port of the diaphragm valve.

5. The fluid control assembly of claim 1, comprising:
a check valve between the first solenoid valve and the diaphragm port.

6. The fluid control assembly of claim 1, comprising:
a fifth solenoid valve to release fluid from an outlet port of the diaphragm valve to a drain.

7. A fluid control system, comprising:
a diaphragm valve, comprising:
  a diaphragm chamber defining a diaphragm port;
  an inlet;
  an outlet; and
  a diaphragm to move, in the diaphragm chamber, based on a release of fluid from the diaphragm chamber through the diaphragm port, between a first state sealing the inlet from the outlet and a second state allowing fluid flow between the inlet and the outlet;
a first electrical control point coupling the diaphragm port with a first fluid line, the first electrical control point to change, responsive to being energized, from a first state to a second state to reduce fluid flow from the first fluid line into the diaphragm chamber through the diaphragm port;

a second electrical control point coupling the diaphragm port with a second fluid line extending to a vent, the second electrical control point to change, responsive to being energized, from a third state to a fourth state to increase fluid flow from the diaphragm chamber into the second fluid line out of the vent; and a controller to transmit a first electrical signal to energize the first electrical control point, responsive to detecting a fire condition, and transmit a second electrical signal to energize the second electrical control point, responsive to detecting the fire condition, the controller to detect the fire condition responsive to a detection signal from a fluid detector coupled with an outlet side of the diaphragm valve, the detection signal indicating at least one of pressure or flow rate.

8. The fluid control system of claim 7, comprising:
a check valve between the first electrical control point and the diaphragm port.

9. The fluid control system of claim 7, comprising:
an inlet port coupled with the inlet, the first fluid line couples the inlet port with the first electrical control point.

10. The fluid control system of claim 7, comprising:
the first electrical control point and the second electrical control point are solenoid valves.

11. The fluid control system of claim 7, comprising:
the fluid detector is a first fluid detector, the fluid control assembly comprising a second fluid detector between the diaphragm port and the first solenoid valve.

12. The fluid control system of claim 7, comprising:
a third electrical control point coupled with an inlet port of the diaphragm valve, the first fluid line coupled with the inlet port.

13. The fluid control system of claim 7, comprising:
a fourth electrical control point coupled with an outlet port of the diaphragm valve.

14. The fluid control system of claim 7, comprising:
a fifth electrical control point to release fluid from an outlet port of the diaphragm valve to a drain.

15. The fluid control system of claim 7, comprising:
a resetting detector to initiate reset of the first electrical control point and the second electrical control point.

16. The fluid control system of claim 7, comprising:
a plurality of sprinklers coupled with the outlet.

* * * * *